United States Patent
Mizuno et al.

(10) Patent No.: US 10,784,482 B2
(45) Date of Patent: *Sep. 22, 2020

(54) MICROPOROUS POLYOLEFIN FILM, SEPARATOR FOR BATTERY, AND PRODUCTION PROCESSES THEREFOR

(71) Applicant: Toray Industries, Inc., Tokyo (JP)

(72) Inventors: Naoki Mizuno, Nasushiobara (JP); Masami Sugata, Nasushiobara (JP)

(73) Assignee: Toray Industries, Inc., Tokyo (JP)

( * ) Notice: Subject to any disclaimer, the term of this patent is extended or adjusted under 35 U.S.C. 154(b) by 168 days.

This patent is subject to a terminal disclaimer.

(21) Appl. No.: 15/531,807

(22) PCT Filed: Nov. 5, 2015

(86) PCT No.: PCT/JP2015/081198
§ 371 (c)(1),
(2) Date: May 31, 2017

(87) PCT Pub. No.: WO2016/092993
PCT Pub. Date: Jun. 16, 2016

(65) Prior Publication Data
US 2017/0317328 A1   Nov. 2, 2017

(30) Foreign Application Priority Data

Dec. 11, 2014   (JP) ................................. 2014-250824

(51) Int. Cl.
*H01M 2/16*  (2006.01)
*B32B 5/32*  (2006.01)
(Continued)

(52) U.S. Cl.
CPC ............. *H01M 2/1653* (2013.01); *B32B 5/32* (2013.01); *B32B 27/32* (2013.01); *C08J 9/28* (2013.01);
(Continued)

(58) Field of Classification Search
CPC .................................. B32B 5/32; B32B 27/32
See application file for complete search history.

(56) References Cited

U.S. PATENT DOCUMENTS

| 2010/0178544 A1 | 7/2010 | Nishikawa | |
| 2016/0126520 A1* | 5/2016 | Mizuno | H01M 2/1653 429/145 |
| 2017/0165893 A1* | 6/2017 | Ichinomiya | B01D 67/0027 |

FOREIGN PATENT DOCUMENTS

| EP | 3 222 656 A1 | 9/1917 |
| JP | 2007-273443 A | 10/2007 |

(Continued)

OTHER PUBLICATIONS

Machine English translationfor WO 2015/190487A1 (2015).*
(Continued)

*Primary Examiner* — Amanda C. Walke
(74) *Attorney, Agent, or Firm* — DLA Piper LLP (US)

(57) ABSTRACT

A polyolefin microporous membrane is suitable to provide thereon a porous layer having little variation in thickness, which has a fluctuation range of F25 value in the length direction of 1 MPa or less, and which has a length of 1,000 m or more (wherein the F25 value refers to a value obtained by: measuring a load value applied to a test specimen when the test specimen is stretched by 25% using a tensile tester; and dividing the load value by the value of the cross-sectional area of the test specimen).

7 Claims, 4 Drawing Sheets

Longitudinal Stretching Apparatus A

(51) Int. Cl.
  *C08J 9/28* (2006.01)
  *B32B 27/32* (2006.01)
  *H01M 2/14* (2006.01)
  *H01M 10/0525* (2010.01)
  *H01M 10/0587* (2010.01)

(52) U.S. Cl.
  CPC ......... *H01M 2/145* (2013.01); *H01M 2/1686* (2013.01); *H01M 10/0525* (2013.01); *H01M 10/0587* (2013.01)

(56) References Cited

FOREIGN PATENT DOCUMENTS

| | | |
|---|---|---|
| JP | 2008-149895 A | 7/2008 |
| JP | 2008-186721 A | 8/2008 |
| JP | 2009-026733 A | 2/2009 |
| JP | 2009-205955 A | 9/2009 |
| JP | 2009-249480 A | 10/2009 |
| JP | 2010-092882 A | 4/2010 |
| JP | 2012-500130 A | 1/2012 |
| JP | 2012-020437 A | 2/2012 |
| JP | 2013-142101 A | 7/2013 |
| JP | 2013-530261 A | 7/2013 |
| KR | 10-2012-0121152 A | 11/2012 |
| WO | 2008/149895 A1 | 12/2008 |
| WO | WO2015/029944 A1 * | 3/2015 |
| WO | WO2015/146580 A1 * | 10/2015 |
| WO | WO2015/190487 A1 * | 12/2015 |

OTHER PUBLICATIONS

Supplementary European Search Report dated Jun. 12, 2018, from counterpart European Application No. 15866428.4.
Office Action dated Mar. 16, 2020, of counterpart Korean Application No. 10-2017-7011993, along with a Partial English translation.

* cited by examiner

Longitudinal Stretching Apparatus A

Longitudinal Stretching Apparatus B

Longitudinal Stretching Apparatus C

Longitudinal Stretching Apparatus D

An Example of a Re-stretching Apparatus

An Example of a Coating Apparatus

MICROPOROUS POLYOLEFIN FILM, SEPARATOR FOR BATTERY, AND PRODUCTION PROCESSES THEREFOR

TECHNICAL FIELD

The present invention relates to: a polyolefin microporous membrane; a battery separator including the polyolefin microporous membrane and a porous layer provided at least on one surface of the polyolefin microporous membrane; and methods of producing the same.

BACKGROUND ART

Thermoplastic resin microporous membranes are widely used as membranes for separating substances, selectively permeable membrane separators, and the like. Examples thereof include: battery separators used in lithium ion secondary batteries, nickel-hydrogen batteries, nickel-cadmium batteries, and polymer batteries; separators for electric double layer capacitors; various types of filters such as reverse osmosis filtration membranes, ultrafiltration membranes, and microfiltration membranes; waterproof and breathable clothing; medical materials, and the like.

As a lithium ion secondary battery separator, in particular, a microporous membrane made of polyethylene is suitably used, which has ion permeability due to electrolyte impregnation, which has excellent electrical insulation properties, and which has a pore-blocking function capable of blocking current at a temperature of about from 120 to 150° C., when the temperature in a battery is abnormally increased, and thereby preventing an excessive increase in the temperature. However, in cases where the temperature increase in the battery persists even after pores in the membrane are blocked, for some reason, the microporous membrane made of polyethylene may be ruptured due to shrinkage thereof. This phenomenon occurs not only in a microporous membrane made of polyethylene, but also in a microporous membrane made of another thermoplastic resin, at a temperature equal to or higher than the melting point of the resin.

A lithium ion battery separator is deeply involved in battery performance, battery productivity and battery safety, and is required to have heat resistance, adhesion to an electrode, permeability, melt rupture properties (meltdown properties), and the like. So far, a technique has been proposed, for example, in which a porous layer is provided on a microporous membrane made of polyolefin, in order to impart heat resistance or adhesive properties to a battery separator. As the resin to be used in the porous layer, a heat resistant resin such as a polyamideimide resin, a polyimide resin or a polyamide resin, or a resin having adhesive properties, such as a fluororesin, is suitably used. Further, a water-soluble or water-dispersible binder is also used in recent years, which allows for lamination of a porous layer with relatively simple steps.

Note that the porous layer as used herein refers to a layer obtained by a wet coating method.

Example 5 in Patent Document 1 discloses a technique in which an aqueous solution prepared by uniformly dispersing titania particles and polyvinyl alcohol in water is coated on a polyethylene microporous membrane precursor obtained by a simultaneous biaxial stretching method, using a gravure coater, and the resultant is then dried at 60° C. to remove water, thereby obtaining a multilayer porous membrane having a total film thickness of 24 µm (coating thickness: 4 µm).

Example 3 in Patent Document 2 discloses a technique in which an aqueous solution prepared by uniformly dispersing titania particles and polyvinyl alcohol in water is coated on a polyolefin microporous membrane obtained by a simultaneous biaxial stretching method, using a bar coater, and the resultant is then dried at 60° C. to remove water, thereby obtaining a multilayer porous membrane having a total film thickness of 19 µm (coating thickness: 3 µm).

Example 1 in Patent Document 3 discloses a technique in which an aqueous solution prepared by uniformly dispersing aluminum particles and polyvinyl alcohol in water is coated on a polyolefin microporous membrane obtained by a simultaneous biaxial stretching method, using a gravure coater, and the resultant is then dried at 60° C. to remove water, thereby obtaining a multilayer porous membrane having a total film thickness of 20 µm (coating thickness: 4 µm).

Example 6 in Patent Document 4 discloses a technique in which a polyethylene microporous membrane obtained by a stepwise biaxial stretching method is passed between Meyer bars on the surface(s) of which an adequate amount a coating liquid containing a meta-type wholly aromatic polyamide, alumina particles, dimethylacetamide (DMAc) and tripropylene glycol (TPG) is applied, and the resultant is then subjected to solidification, water-washing and drying steps, thereby obtaining a nonaqueous secondary battery separator including a heat resistant porous layer formed on the microporous membrane.

Patent Document 5 discloses a technique in which a polyethylene microporous membrane obtained by a stepwise biaxial stretching method is passed between opposed Meyer bars on the surface(s) of which an adequate amount of a coating liquid composed of a meta-type wholly aromatic polyamide, aluminum hydroxide, DMAc and TPG is applied, and the resultant is then subjected to solidification, water-washing and drying steps, thereby obtaining a non-aqueous secondary battery separator including a heat resistant porous layer formed on the microporous membrane.

Patent Document 6 discloses a technique in which a polyethylene microporous membrane obtained by a stepwise biaxial stretching method is passed between opposed Meyer bars on the surface(s) of which an adequate amount of a coating liquid composed of polymetaphenylene isophthalamide, aluminum hydroxide, DMAc and TPG is applied, and the resultant is then subjected to solidification, water-washing and drying steps, thereby obtaining a nonaqueous secondary battery separator including a heat resistant porous layer formed on the microporous membrane.

Patent Document 7 discloses a technique in which a laminated porous film is obtained by a combination of a so-called stepwise biaxial stretching method and an in-line coating method. Specifically, a non-porous membrane-like product having a three-layer structure and including as an outer layer a layer containing polypropylene containing a β-crystal nucleating agent, is stretched in the longitudinal direction using a longitudinal stretching apparatus; then an aqueous dispersion containing alumina particles and polyvinyl alcohol is coated on the resultant, using a Meyer bar; and subsequently, the resultant is subjected to 2-fold stretching in the transverse direction, followed by thermal fixation/relaxation treatments; thereby obtaining the laminated porous film.

Patent Document 8 exemplifies a separation membrane which is obtained by a stepwise biaxial stretching method using a longitudinal stretching machine including 4 stretching rolls, wherein the stretching rolls are configured such that an object to be stretched comes into contact with the stretching rolls at an angle equal to or greater than a certain angle.

PRIOR ART DOCUMENTS

Patent Documents

Patent Document 1: JP 2007-273443 A
Patent Document 2: JP 2008-186721 A
Patent Document 3: JP 2009-026733 A
Patent Document 4: JP 2008-149895 B
Patent Document 5: JP 2010-092882 A
Patent Document 6: JP 2009-205955 A
Patent Document 7: JP 2012-020437 A
Patent Document 8: JP 2013-530261 A

SUMMARY OF THE INVENTION

Problems to be Solved by the Invention

In recent years, lithium ion secondary batteries, in particular, are expected to be used not only in small electronic devices such as mobile phones and personal digital assistant devices, but also in large size applications such as large tablets, grass cutters, electric motorcycles, electric cars, hybrid cars, and small marine vessels. As large batteries are expected to be increasingly popular, an increase in capacity of lithium ion secondary batteries and a reduction in cost are demanded at the same time. In order to achieve a reduction in production cost, it is expected that the demand for long-length battery separators having a length of 1,000 m or more will increase more than ever. An increase in the length of a battery separator allows for reducing the time required for replacing a wound roll of the battery separator during a slitting step or a battery assembly step, and thus, it is possible to obtain a battery separator which allows for reducing waste of materials.

In a battery separator in which a porous layer is to be provided, when the porous layer has a large thickness fluctuation range in the length direction, the porous layer includes a thin portion whose thickness is insufficient for providing sufficient functions. In such a case, the porous layer needs to have an average thickness of 1.5 times to 2 times its minimum required thickness, in order to sufficiently secure the functions of the porous layer, and thus results in an increase in the cost. Further, an increase in the thickness of a battery separator leads to a decrease in the number of winding of the resulting electrode roll, and it may be a cause for obstructing an increase in the capacity of a battery.

Further, an increased length of a battery separator results in an increased diameter of a wound roll obtained by winding the battery separator, which in turn adversely affects the winding appearance of the wound roll, such as, for example, the wound roll may be more susceptible to winding displacement. In cases where a thinner separator is used, the number of winding of the resulting wound roll is further increased, and the adverse effect as described above will be pronounced.

An object of the present invention is to provide a polyolefin microporous membrane which is suitable for providing thereon a porous layer having a uniform thickness, which has a length of 1,000 m or more, and which has a fluctuation range of F25 value in the length direction of 1 MPa or less. Further, another object of the present invention is to provide a battery separator which includes: the polyolefin microporous membrane; and a porous layer formed on the polyolefin microporous membrane and having a uniform thickness; and which is suitable for increasing the capacity of a battery. Note that, the expression that the porous layer has a uniform thickness, as used herein, means that that the porous layer has a thickness fluctuation range (R) in the length direction of 1.0 μm or less.

Means for Solving the Problems

In view of the above mentioned problems, the present inventors have not only made intensive studies on coating techniques, but also investigated a coating method suitable for a polyolefin microporous membrane, thereby completing the present invention.

In order to solve the above mentioned problems, the laminated polyolefin microporous membrane and the battery separator according to the present invention have the following constitutions.

Specifically, as follows.

(1) A polyolefin microporous membrane which has a fluctuation range of F25 value in the length direction of 1 MPa or less, and which has a length of 1,000 m or more. In the above described (1), the F25 value refers to a value obtained by: measuring a load value applied to a test specimen when the test specimen is stretched by 25% using a tensile tester; and dividing the load value by the value of the cross-sectional area of the test specimen.

(2) A battery separator including: a polyolefin microporous membrane which has a fluctuation range of F25 value in the length direction of 1 MPa or less; and a porous layer which is formed on at least one surface of the polyolefin microporous membrane, which contains a water-soluble resin or a water-dispersible resin and heat resistance particles, and which has an average thickness T(ave) of from 1 to 5 μm (wherein the F25 value refers to a value obtained by: measuring a load value applied to a test specimen when the test specimen is stretched by 25% using a tensile tester; and dividing the load value by the value of the cross-sectional area of the test specimen).

(3) A battery separator including: the polyolefin microporous membrane according to (1); and a porous layer which is formed on at least one surface of the polyolefin microporous membrane, which contains a water-soluble resin or a water-dispersible resin and heat resistance particles, and which has an average thickness T(ave) of from 1 to 5 μm.

(4) The above described battery separator, wherein the porous layer has a thickness fluctuation range (R) in the length direction of 1.0 μm or less.

(5) The above described battery separator, wherein the water-soluble resin or the water-dispersible resin contains at least one of polyvinyl alcohol, an acrylic resin and a polyvinylidene fluoride resin.

(6) The above described battery separator, wherein the polyolefin microporous membrane has a length of 2,000 m or more.

(7) The above described battery separator, wherein the polyolefin microporous membrane has a width of 3,000 m or more.

In order to solve the above mentioned problems, the method of producing a polyolefin microporous membrane and the method of producing a battery separator, according to the present invention, have the following constitutions. Specifically, as follows.

(8) A method of producing a polyolefin microporous membrane, the method including the steps of:
(a) melt blending a polyolefin resin and a membrane-forming solvent to prepare a polyolefin resin solution;

(b) extruding the polyolefin resin solution in the form of a sheet, by an extruder, and cooling the resultant to form an unstretched gel-like sheet;

(c) allowing the unstretched gel-like sheet to pass through at least 3 sets of longitudinal stretching rolls, to be stretched in the longitudinal direction by the stretching rolls whose respective tip speeds are set at progressively higher rates in the direction in which the sheet passes, thereby obtaining a longitudinally stretched gel-like sheet (wherein one longitudinal stretching roll, and one or more nip rolls coated with a heat resistant rubber and in contact with the longitudinal stretching roll in parallel, are defined as one set of longitudinal stretching rolls, wherein the nip roll(s) comes into contact with the longitudinal stretching roll at a pressure of 0.05 MPa or more and 0.5 MPa or less);

(d) stretching the longitudinally stretched gel-like sheet in the transverse direction, with the sheet held such that the distance between clips at a tenter exit is 50 mm or less, to obtain a biaxially stretched gel-like sheet;

(e) extracting the membrane-forming solvent from the biaxially stretched gel-like sheet, followed by drying; and (f) subjecting the dried sheet to a heat treatment, to obtain a polyolefin microporous membrane.

(9) The above described method of producing a polyolefin microporous membrane, wherein the tip speed ratios between respective two adjacent stretching rolls are set at progressively higher rates.

(10) A method of producing a wound roll of a polyolefin microporous membrane, the method including the step of winding the polyolefin microporous membrane obtained by the above described production method at a transport speed of 50 m/min or more.

(11) A method of producing a battery separator, the method including the step of coating a coating liquid containing a water-soluble resin or a water-dispersible resin and microparticles, on at least one surface of the polyolefin microporous membrane obtained by the above described production method, using a coating roll having a deflection accuracy of 10 μm/Φ100 mm or less, followed by drying.

(12) The above described method of producing a battery separator, wherein the coating roll is a gravure roll.

Effect of the Invention

According to the present invention, it is possible to obtain a polyolefin microporous membrane which is suitable for providing thereon a porous layer having a uniform thickness, and which has a length of 1,000 m or more. Further, according to the present invention, it is possible to obtain a battery separator which includes: the polyolefin microporous membrane; and a porous layer formed on the polyolefin microporous membrane and having a uniform thickness; and which is suitable for increasing the capacity of a battery.

MODE FOR CARRYING OUT THE INVENTION

Figure 1:
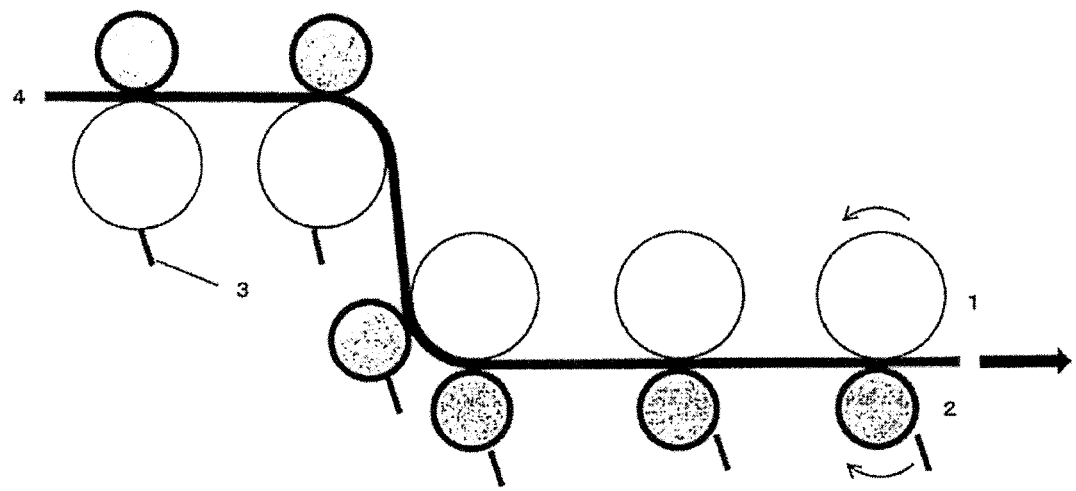
FIG. 1 is a schematic diagram of a longitudinal stretching apparatus A which is used for stepwise biaxial stretching.

The polyolefin microporous membrane according to the present invention has a length of 1,000 m or more, and has a fluctuation range of F25 value in the length direction of 1 MPa or less (wherein the F25 value refers to a value obtained by: measuring a load value applied to a test specimen when the test specimen is stretched by 25% using a tensile tester; and dividing the load value by the value of the cross-sectional area of the test specimen).

By adjusting the fluctuation range of the F25 value in the length direction of the polyolefin microporous membrane to 1 MPa or less, the present invention provides an excellent effect that the contact pressure at a tangential line (hereinafter, abbreviated as "coating tangential line") between the polyolefin microporous membrane and a coating roll is more likely to be uniform with respect to the length direction of the polyolefin microporous membrane, thereby facilitating to obtain a uniform coating thickness. When the fluctuation range of the F25 value in the length direction is greater than 1 MPa, unevenness in winding hardness occurs in a wound roll of the microporous membrane during the winding of the microporous membrane in a slitting step or a coating step. As a result, deflection or winding displacement is more likely to occur, resulting in a poor winding appearance. The above described phenomenon becomes pronounced, for example, in cases where the microporous membrane is processed at a high speed, such as when the membrane is wound about a winding core at a transport speed of 50 m/min or more.

1. Polyolefin Microporous Membrane

First, the polyolefin microporous membrane according to the present invention will be described.

The polyolefin microporous membrane according to the present invention has a fluctuation range of the F25 value in the length direction of 1 MPa or less. The fluctuation range is preferably 0.8 MPa or less, more preferably 0.6 MPa or less, and still more preferably 0.4 MPa or less. As will be described below, it is possible to control the fluctuation range of the F25 value in the length direction of the polyethylene microporous membrane, by controlling the conditions in a longitudinal stretching step and a transverse stretching step at a high level, in particular.

Examples of polyolefin resins to be included in the polyolefin microporous membrane include polyethylenes and polypropylenes. The polyolefin resin may be: a simple substance of a polyolefin resin; a mixture of two or more different types of polyolefin resins, such as a mixture of polyethylene and polypropylene; or a copolymer of different types of olefins. Of these, polyethylene is particularly preferred in terms of pore-blocking performance. Further, a polyethylene having a melting point (softening point) of from 70 to 150° C. is preferred, in terms of the pore-blocking performance.

Polyolefin resins to be used in the present invention will be described below, with reference to polyethylene as an example.

Examples of the polyethylene include ultra-high molecular weight polyethylenes, high density polyethylenes, medium density polyethylenes, and low density polyethylenes. A polymerization catalyst to be used is not particularly limited, and a Ziegler-Natta catalyst, a Phillips catalyst, or a metallocene catalyst can be used. The polyethylene as described above may be not only a homopolymer of ethylene, but also a copolymer containing a small amount of α-olefin other than ethylene. Suitable examples of the α-olefin other than ethylene include propylene, 1-butene, 1-pentene, 1-hexene, 4-methyl-1-pentene, 1-octene, (meth) acrylic acid, (meth)acrylic acid ester, styrene, and the like. The polyethylene may be a simple substance, or a polyethylene mixture composed of two or more types of polyethylenes.

The polyethylene mixture may be a mixture of two or more types: of ultra-high molecular weight polyethylenes, of high density polyethylenes, of medium density polyethylenes, or of low density polyethylenes, having different weight-average molecular weights (Mw). Alternatively, the polyethylene mixture may be a mixture of two or more types of polyethylenes selected from the group consisting of ultra-high molecular weight polyethylenes, high density polyethylenes, medium density polyethylenes and low density polyethylenes. The polyethylene mixture is preferably a mixture composed of an ultra-high molecular weight polyethylene having an Mw of $5 \times 10^5$ or more and a polyethylene having an Mw of $1 \times 10^4$ or more and less than $5 \times 10^5$. The content of the ultra-high molecular weight polyethylene in the mixture is preferably from 1 to 40% by weight, in terms of tensile strength.

The polyethylene preferably has a molecular weight distribution (weight-average molecular weight (Mw)/number average molecular weight (Mn)) within the range of from 5 to 200, in terms of mechanical strength.

2. Method of Producing Polyethylene Microporous Membrane

Next, the method of producing a polyethylene microporous membrane will be described.

The method of producing a polyethylene microporous membrane can be carried out by a dry process (a method in which porosification is carried out using a crystal nucleating agent or particles, without using a membrane-forming solvent (also referred to as stretching pore-forming process)), or a wet process (phase separation method). A wet process is preferred, in terms of obtaining a microporous membrane having uniform micropores and good flatness.

Examples of the production method using a wet process include a method in which: a polyethylene and a membrane-forming solvent are subjected to heating and melt blending; the resulting resin solution is extruded through a die, followed by cooling, to form an unstretched gel-like sheet; and the resulting unstretched gel-like sheet is subjected to stretching at least in uniaxial direction, followed by removing the membrane-forming solvent and drying, thereby obtaining a microporous membrane.

The polyethylene microporous membrane may be a monolayer membrane, or a membrane having a layer structure composed of two or more layers having different molecular weights or average pore diameters. In cases where the polyethylene microporous membrane has a layer structure composed of two or more layers, at least one polyethylene resin contained in its outermost layer has a molecular weight and a molecular weight distribution satisfying the above described ranges.

The polyethylene microporous membrane having a layer structure composed of two or more layers can be produced, for example, either by: a method in which each of the polyethylenes constituting layer a and layer b, and a membrane-forming solvent, are subjected to heating and melt blending, and the respective resulting resin solutions are supplied from respective extruders to one die, to be integrated and co-extruded; or a method in which respective gel-like sheets constituting respective layers are layered one on another, and heat fused. The method utilizing co-extrusion is preferred, because: an adhesive strength between layers can be easily obtained; a high permeability can be easily maintained due to being able to easily form communication pores communicating between layers; and an excellent productivity can be obtained.

The method of producing the polyolefin microporous membrane according to the present invention will now be described in details.

In the present invention, the unstretched gel-like sheet is subjected to stretching in two directions, namely in the length direction (also referred to as "MD" or "machine direction", or "longitudinal direction") and in the width direction (also referred to as "TD" or "transverse direction"), to a predetermined magnification, by a roll method, a tenter method, or a combination of these methods. In the present invention, the stretching is preferably carried out by a stepwise biaxial stretching method, in which the stretching in the longitudinal direction and the stretching in the transverse direction are carried out in sequence. In a simultaneous biaxial stretching method, the unstretched gel-like sheet is fixed by clips holding both ends of the sheet, and then the clips are extended apart in the longitudinal direction and the transverse direction, simultaneously. The simultaneous biaxial stretching method as described above is not preferred, because the distance between the clips is increased with an increase in the stretching magnification, and this leads to variations in the quality of the sheet in the length direction, resulting in an increase in the fluctuation range of the F25 value in the length direction.

The method of producing a polyolefin microporous membrane according to the present invention includes the following steps (a) to (f):

(a) a step of melt blending a polyolefin resin and a membrane-forming solvent to prepare a polyolefin resin solution;

(b) a step of extruding the polyolefin resin solution in the form of a sheet, by an extruder, and cooling the resultant to form an unstretched gel-like sheet;

(c) a longitudinal stretching step of stretching the unstretched gel-like sheet in the longitudinal direction to form a longitudinally stretched gel-like sheet;

(d) a step of stretching the longitudinally stretched gel-like sheet in the transverse direction, with the sheet held such that the distance between clips at a tenter exit is 50 mm or less, to obtain a biaxially stretched gel-like sheet;

(e) a step of removing the membrane-forming solvent from the biaxially stretched gel-like sheet, followed by drying; and (f) a step of subjecting the dried sheet to a heat treatment, to obtain a polyolefin macroporous membrane.

Further, a corona treatment step or the like can be carried out as necessary, after carrying out the steps (a) to (f).

Each of the steps will be described below, with reference to an example in which a polyethylene resin is used as the polyolefin resin.

(a) Step of Preparing Polyethylene Resin Solution

In the step of preparing a polyethylene resin solution, a membrane-forming solvent is added to a polyethylene resin, and then the resultant is subjected to melt blending, to prepare a polyolefin resin solution. Examples of the melt blending method include methods using a twin screw extruder, which are disclosed in JP 06-104736 B and JP 3347835 B. The description regarding the melt blending method is omitted, since it is a well-known method.

The membrane-forming solvent is not particularly limited, as long as it is capable of sufficiently melting polyethylene. Examples thereof include aliphatic and cyclic hydrocarbons such as nonane, decane, undecane, dodecane and liquid paraffin; mineral oil distillates having a boiling point comparable to the boiling points of these hydrocarbons. However, a non-volatile solvent such as liquid paraffin is preferred.

The concentration of the polyethylene resin in the polyethylene resin solution is preferably from 25 to 40 parts by weight, with respect to 100 parts by weight of the total amount of the polyethylene resin and the membrane-forming solvent. When the concentration of the polyethylene resin is within the preferred range described above, it is possible to prevent an occurrence of swelling or neck-in at the exit of a die when the polyethylene resin solution is extruded therefrom, and to maintain the formability and self-supportability of the gel-like sheet.

(b) Step of Forming Unstretched Gel-Like Sheet

In the step of forming an unstretched gel-like sheet, the polyethylene resin solution is supplied to a die directly from an extruder or through another extruder, and extruded in the form of a sheet, followed by cooling, to form an unstretched gel-like sheet. Alternatively, a plurality of polyolefin solutions having the same or different compositions may be supplied to one die from respective extruders, laminated in layers thereat, and then extruded in the form of a sheet.

The extrusion method may be either a flat die method or an inflation method. The extrusion is preferably carried out at an extrusion temperature of from 140 to 250° C., and at an extrusion speed of from 0.2 to 15 m/min. Adjustment of film thickness can be carried out by adjusting the amount of each polyolefin solution to be extruded. As the extrusion method, methods disclosed in JP 06-104736 B and JP 3347835 B can be used, for example.

The resulting polyethylene resin solution extruded in the form of a sheet is then cooled to form a gel-like sheet. Cooling can be carried out by using a method in which the extruded resin solution is brought into contact with a coolant such as cold blast or cooling water, a method in which the extruded resin solution is brought into contact with a chill roll, or the like. However, the extruded resin solution is preferably cooled by being brought into contact with a roll cooled by a coolant. For example, the polyethylene resin solution extruded in the form of a sheet can be brought into contact with a rotatable chill roll whose surface temperature is adjusted to 20° C. to 40° C. with a coolant, to form an unstretched gel-like sheet. The extruded polyethylene resin solution is preferably cooled to 25° C. or lower.

(c) Longitudinal Stretching Step

In the longitudinal stretching step, the resulting unstretched gel-like sheet is passed through a plurality of pre-heated rolls to be heated to a predetermined temperature, and then passed through at least 3 sets of longitudinal stretching rolls, whose tip speeds are set at progressively higher rate, to be stretched in the longitudinal direction, thereby obtaining a longitudinally stretched gel-like sheet.

In the present invention, it is important to reduce sheet slippage in the longitudinal stretching step, and to carry out longitudinal stretching uniformly, in order to control the F25 value in the length direction.

In the stretching step, one longitudinal stretching roll, and one or more nip rolls which are in contact with the longitudinal stretching roll in parallel at a certain pressure, are defined as one set of rolls, and the unstretched gel-like sheet is allowed to pass through at least 3 sets of rolls, to be longitudinally stretched due to the tip speed ratios between the sets of rolls. By disposing the nip rolls in parallel with the longitudinal stretching rolls, it is possible to allow the sheet to be closely adhered onto the longitudinal stretching rolls, and to allow a stable transportation of the sheet due to being able to fix the stretching position of the sheet, thereby enabling a uniform longitudinal stretching. Further, in order to carry out a uniform longitudinal stretching, it is preferred that the longitudinal stretching step be performed in two or more stretching stages, rather than in a single stretching stage, to stretch the sheet to a desired magnification. In other words, it is important to dispose 3 or more sets of longitudinal stretching rolls.

In the present invention, it is important that the unstretched gel-like sheet is stretched in the length direction, by setting the tip speeds of the respective stretching rolls at progressively higher rates. Further, it is preferred that the tip speed ratios between respective two adjacent stretching rolls be also set at progressively higher rates. In other words, the tip speed ratio between a first stretching roll and a second stretching roll is set to be small, and the tip speed ratio between the second stretching roll and a third stretching roll, and the tip speed ratio between the third stretching roll and a fourth stretching roll are set at progressively higher rates in this order. This arrangement allows for controlling the fluctuation range of the F25 in the length direction and improving the productivity, at the same time. The reason for the above is as follows. At the point when the unstretched gel-like formed sheet passes through the first stretching roll, the sheet contains a large amount of membrane-forming solvent, and thus is susceptible to slippage. However, when the tip speed ratios between respective two adjacent stretching rolls are set at progressively higher rates, an effect of squeezing out the membrane-forming solvent is more likely to be obtained, and the slippage during the longitudinal stretching step can be prevented. The effect of squeezing out the solvent as used herein refers to an effect of squeezing the membrane-forming solvent out of the unstretched gel-like sheet, or out of the gel-like sheet being longitudinally stretched, to reduce the slippage of the sheet on the longitudinal stretching rolls, thereby allowing for a stable stretching.

The upper limit of the tip speed ratio between two adjacent stretching rolls in the first stage of the stretching step is preferably 1.5 or less, and more preferably 1.3 or less, and still more preferably 1.2 or less. The lower limit thereof is preferably 1.1. Further, the differences in the tip speed ratios between respective two adjacent stretching rolls are each preferably 0.5 or less, preferably 0.4 or less, and more preferably 0.3 or less.

Two adjacent stretching rolls are preferably disposed at an interval, such that the distance from the point at which the gel-like formed sheet being stretched comes out of contact with one stretching roll, to the point at which the sheet comes into contact with the next stretching roll, is from 150 mm to 500 mm. When the interval between two adjacent stretching rolls is less than 150 mm, the fluctuation range of the F25 value may be increased. When the interval is greater than 500 mm, on the other hand, it is possible to prevent a decrease in the temperature of the gel-like formed sheet being stretched, thereby preventing the occurrence of stretching plaques.

The temperature of the sheet in the longitudinal stretching step is preferably equal to or lower than the melting point of the polyolefin resin +10° C. Further, the sheet is preferably stretched to an areal magnification of 9-fold or more, and more preferably from 16-fold to 400-fold, in terms of the elasticity and the strength of the resulting polyolefin microporous membrane.

The surface temperatures of the longitudinal stretching rolls are controlled such that the fluctuation range of the surface temperature of each stretching roll in its effective width (the width within which the sheet being stretched passes through) is within ±2° C. The surface temperature of each longitudinal stretching roll can be measured, for example, by an infrared thermometer.

The longitudinal stretching rolls are preferably hard chromium plated metal rolls having a surface roughness of from 0.3 S to 5.0 S. When the surface roughness is within the above range, the stretching rolls have a good thermal conductivity, and the slippage of the sheet can be effectively prevented due to a synergistic effect with the nip rolls.

In the present invention, nip rolls are used for preventing the slippage of the sheet in the longitudinal stretching step. Merely increasing the contact area between the longitudinal stretching rolls and the gel-like sheet, without using nip rolls, may not be able to provide a sufficient effect of preventing the slippage, and there is a risk that the fluctuation range of the F25 values is increased. Further, when only one nip roll is used for preventing the slippage of the sheet, the pressure (also referred to as "nip pressure") at which the nip roll comes into contact with a stretching roll needs to be increased, and thus, there is a risk that the micropores in the resulting polyethylene microporous membrane may be crushed. Accordingly, it is important that 3 or more nip rolls be used, and that the nip pressure of each nip roll against each longitudinal stretching roll to be paired with the nip roll is reduced to a relatively small level. A plurality of nip rolls may be used for one longitudinal stretching roll.

The nip pressure of each nip roll is 0.05 MPa or more and 0.5 MPa or less. When the nip pressure of the nip roll is greater than 0.5 MPa, there is a risk that the micropores in the resulting polyethylene microporous membrane may be crushed. When the nip pressure is less than 0.05 MPa, on the other hand, it is insufficient for obtaining the effect of preventing the slippage of the sheet, and the effect of squeezing out the membrane-forming solvent is not easily obtained. The lower limit of the nip pressure of the nip roll is preferably 0.1 MPa, and more preferably 0.2 MPa; and the upper limit thereof is preferably 0.5 MPa, and more preferably 0.4 MPa. When the nip pressure of the nip roll is within the above range, an adequate effect of preventing the slippage can be obtained.

Further, each nip roll needs to be coated by a heat resistant rubber. During the longitudinal stretching step, a pressure due to heat and tensile force causes the membrane-forming solvent to bleed out from the gel-like sheet. In particular, the bleed-out which occurs in the longitudinal stretching step immediately after the extrusion is pronounced. At this time, the transportation and the stretching of the sheet are carried out with the bled-out membrane-forming solvent present at interfaces between the sheet and the roll surfaces, and thus making the sheet susceptible to slippage. When the nip rolls coated with a heat resistant rubber are disposed so as to come into contact with the longitudinal stretching rolls in parallel, and the unstretched gel-like sheet is allowed to pass therebetween, it is possible to carry out stretching while squeezing the membrane-forming solvent out of the gel-like sheet being stretched, thereby preventing the slippage of the sheet.

Each nip roll is preferably a roll obtained by coating a heat resistant rubber to a coating thickness of from 3 to 20 mm, on a metal roll having a diameter of from 100 mm to 300 mm. It is not preferable to use a so-called rubber roll, in which the volume of the portion made of a heat resistant rubber accounts for 80% or more of the volume of the roll, because the roll is susceptible to deflection, and it is difficult to apply a uniform pressure in the width direction.

If a method (also referred to as scraping means) for removing the membrane-forming solvent adhered to the longitudinal stretching rolls and nip rolls is used in combination, in the longitudinal stretching step, an enhanced effect of preventing the slippage can be obtained. The scraping means is not particularly limited, and a method using a doctor blade, a method in which compressed air is used to blow away the solvent, a method utilizing suction, or a mixture of these methods can be used. In particular, a method using a doctor blade to scrape off the solvent can be carried out relatively easily, and therefore preferred. Specifically, a method is preferred, in which a doctor blade is disposed on a longitudinal stretching roll such that the blade is in parallel with the width direction of the longitudinal stretching roll, and the membrane-forming solvent is scraped off by the blade from the surface of the stretching roll, to the extent that the residual solvent cannot be visually observed on the roll surface from the point immediately after passing the doctor blade until the point the gel-like sheet being stretched comes into contact therewith. One doctor blade or a plurality of doctor blades may be used. Further, the scraping means may be provided on either a longitudinal stretching roll or a nip roll, or alternatively, on both.

A material for the doctor blade is not particularly limited, and any material having resistance to the membrane-forming solvent can be used. However, a doctor blade made of resin or rubber is preferred, rather than one made of metal. A doctor blade made of metal has a risk of causing defects on the stretching roll. Examples of the doctor blade made of resin include a blade made of polyester, a blade made of polyacetal, and a blade made of polyethylene.

(d) Transverse Stretching Step

In the transverse stretching step, after fixing both ends of the longitudinally stretched gel-like sheet with clips, the clips are extended apart in the transverse direction within a tenter, to stretch the longitudinally stretched gel-like sheet in the transverse direction, thereby obtaining a biaxially stretched gel-like sheet. At this time, the distance between the clips against the travelling direction of the sheet is preferably maintained at 50 mm or less, more preferably 25 mm or less, and still more preferably 10 mm or less, from the entrance to the exit of the tenter. When the distance between the clips is within the above preferred range, it is possible to reduce the fluctuation range of the F25 value in the width direction.

In the transverse stretching step or the heat treatment step, it is preferred that the area within the tenter be divided in 10 to 30 zones, and the temperature of each zone be controlled independently, so that the impact due to sudden temperature changes can be reduced. In particular, it is preferred that the temperatures in the respective zones be adjusted to progressively higher temperatures in the sheet travelling direction, with hot blast, toward the zone in which the temperature is controlled to the highest temperature in the heat treatment step, so that sudden temperature changes between the respective zones in the heat treatment step can be prevented.

(e) Step of Removing the Membrane-Forming Solvent from the Biaxially Stretched Gel-Like Sheet, Followed by Drying A removal/cleaning solvent is used to carry out the removal (cleaning) of the membrane-forming solvent from the biaxially stretched gel-like sheet. Examples of the cleaning solvent include volatile solvents, for example: hydrocarbons such as pentane, hexane, and heptane; chlorinated hydrocarbons such as methylene chloride, and carbon tetrachloride; fluorinated hydrocarbons such as ethane trifluoride; and ethers such as diethyl ether and dioxane. These cleaning solvents can be selected as appropriate depending on the type of membrane-forming solvent used for dissolving polyethylene, and are used singly or as a mixture. The cleaning can be carried out by a method in which the sheet is immersed in the cleaning solvent to extract the membrane-forming solvent, a method in which the cleaning solvent is showered on the sheet, a method in which the cleaning solvent is sucked through the sheet from the opposite side of the sheet, or a combination of these methods. The cleaning as described above is carried out until the amount of the residual solvent in the sheet is reduced to less than 1% by weight. Subsequently, the sheet is subjected to drying, and the drying can be carried out by a method such as heat drying or air drying.

(f) Step of Subjecting the Dried Sheet to Heat Treatment to Obtain Polyolefin Microporous Membrane The dried sheet is subjected to a heat treatment to obtain a polyethylene microporous membrane. The heat treatment is preferably carried out at a temperature within the range of from 90 to 150° C., in terms of heat shrinkage and air resistance. The residence time in the heat treatment step is not particularly limited. In general, however, the residence time is preferably 1 second or more and 10 minutes or less, and more preferably 3 seconds or more and 2 minutes or less. The heat treatment can be carried out by any of a tenter method, a roll method, a rolling method, and a free method.

In the heat treatment step, the sheet is preferably allowed to shrink at least in one of the length direction and the width direction, while fixing the sheet in both the length direction and the width direction. The heat treatment step allows for eliminating the strain remaining in the polyolefin microporous membrane. The shrinkage in the length direction or the width direction in the heat treatment step is preferably from 0.01 to 50%, and more preferably from 3 to 20%, in terms of the heat shrinkage and the air resistance. Further, the sheet may be subjected to re-stretching, in order to improve the mechanical strength. The re-stretching step may be carried out either by a stretching roll method or a tenter method. Further, after carrying out the steps (a) to (f), a step of imparting a function, such as a corona treatment step or a hydrophilizing step, may be carried out as necessary.

As described above, it is possible to reduce the fluctuation range of the F25 value in the length direction of the polyethylene microporous membrane, by controlling the longitudinal stretching and the transverse stretching at a high level. This not only facilitates a reduction in the fluctuation range of the coating thickness in the step of laminating a porous layer to be described later, but also allows for obtaining a wound roll of a battery separator, having a good winding appearance. Further, by adjusting the fluctuation range of the F25 value to 1 MPa or less, it is possible to prevent the microporous membrane from meandering during the transportation in the slitting step or the coating step, even in cases where the membrane is processed at a high speed, for example, when the membrane is wound by a rewinder at a transport speed of greater than 50 ml min.

The width of the polyolefin microporous membrane is not particularly limited. However, the lower limit of the width is preferably 500 mm, more preferably 600 mm, and still more preferably 1,000 mm; and the upper limit of the width is preferably 4,000 mm, more preferably 3,000 mm, and still more preferably 2,000 mm. When the thickness of the polyolefin microporous membrane is within the above range, the microporous membrane is suitably used in the production of a battery having a high capacity, and is less susceptible to deflection due to self-weight.

The lower limit of the length of the polyolefin microporous membrane is preferably 1,000 m, more preferably 2,000 m, and still more preferably 3,000 m. The upper limit is not particularly defined; however, it is preferably 10,000 m, more preferably 8,000 m, and still more preferably 7,000 m. When the length of the polyolefin microporous membrane is within the above range, the productivity is improved, and the polyolefin microporous membrane is less susceptible to deflection due to self-weight when wound into a wound roll.

The polyolefin microporous membrane preferably has a thickness of from 5 to 25 μm, in terms of increasing the capacity of the resulting battery.

The polyolefin microporous membrane preferably has an air resistance of from 50 sec/100 cc Air to 300 sec/100 cc Air.

The polyolefin microporous membrane preferably has a porosity of from 30 to 70%.

The polyolefin microporous membrane preferably has an average pore diameter of from 0.01 to 1.0 μm, in terms of pore-blocking performance.

3. Porous Layer

The porous layer will now be described.

The porous layer as used in the present invention is provided for imparting or improving at least one of the functions such as heat resistance, adhesion to an electrode material, and electrolyte permeability. The porous layer is composed of inorganic particles and a resin(s). The resin serves to bind inorganic particles with one another, and to bind the polyolefin microporous membrane and the porous layer, in addition to imparting or improving the above described function(s). Examples of the resin include polyvinyl alcohol, cellulose ether resins, acrylic resins, and the like. Examples of the cellulose ether resin include carboxymethyl cellulose (CMC), hydroxyethyl cellulose (HEC), carboxyethyl cellulose, methyl cellulose, ethyl cellulose, cyanoethyl cellulose, oxyethyl cellulose, polyvinylidene fluoride resins, and the like. Further, the resin may be used as an aqueous solution or an aqueous dispersion thereof, and a commercially available product thereof can also be used. Examples of the commercially available product include: "POVACOAT" (registered trademark) manufactured by Nisshin Kasei Co., Ltd.; "JURYMER" (registered trademark) AT-510, ET-410, FC-60, and SEK-301, manufactured by TOAGOSEI Co., Ltd.; UW-223SX and UW-550CS, manufactured by Taisei Fine Chemical Co., Ltd.; WE-301, EC-906EF and CG-8490, manufactured by DIC Corporation; "KYRNAR" (registered trademark) WATERBORNE, manufactured by Arkema Co., Ltd.; VINYCOAT PVDF AQ360, manufactured by Higashi Nippon Toryo Co., Ltd.; and the like. In cases where importance is placed on heat resistance, polyvinyl alcohol or an acrylic resin is suitable, and in cases where importance is placed on adhesion to an electrode and affinity with nonaqueous electrolyte solution, a polyvinylidene fluoride resin is suitable.

The inorganic particles preferably have an average particle size of 1.5 times or more and 50 times or less, and more preferably 2 times or more and 20 times or less the average pore diameter of the polyolefin microporous membrane. When the average particle size of the inorganic particles is within the above preferred range, it is possible to prevent the clogging of the micropores in the polyolefin microporous membrane, when the heat resistant resin and the particles are in a mixed state. As a result, the air resistance can be maintained. Further, it serves to prevent the falling out of the particles in a battery assembly step, and thereby preventing the occurrence of serious defects in the resulting battery.

In order to reduce curling of a separator due to lamination of the porous layer, it is important that the porous layer contain inorganic particles. Examples of the inorganic particles include particles of calcium carbonate, calcium phosphate, amorphous silica, crystalline glass filler, kaolin, talc, titanium dioxide, alumina, silica-alumina composite oxide, barium sulfate, calcium fluoride, lithium fluoride, zeolite, molybdenum sulfide, mica, boehmite, and the like. Further, heat resistant crosslinked polymer particles may be added, as necessary. Examples of the heat resistant crosslinked polymer particles include crosslinked polystyrene particles, crosslinked acrylic resin particles, crosslinked methyl methacrylate particles, and the like. The inorganic particles may be, for example, in the shape of true spheres, approximate spheres, plates, needles, or polyhedrons, but not particularly limited thereto.

The upper limit of the content of the inorganic particles contained in the porous layer is preferably 98 vol %, and more preferably 95 vol %. The lower limit is preferably 50 vol %, and more preferably 60 vol %. When the amount of the inorganic particles added is within the above preferred range, a sufficient effect of reducing the curl can be obtained, and the proportion of the functional resin is optimum with respect to the total volume of the porous layer.

The lower limit of the average thickness T(ave) of the porous layer is preferably 1 μm, and more preferably 1.5 μm, and still more preferably 2.0 μm. The upper limit thereof is preferably 5 μm, more preferably 4 and still more preferably 3 μm. When the porous layer thickness is within the above preferred range, it is possible to reduce the thickness fluctuation range (R) of the porous layer. In a battery separator obtained by laminating the porous layer on the polyolefin microporous membrane, membrane rupture strength and electrical insulation properties when melted and shrunk at a temperature equal to or higher than the melting point can be secured. Further, such a battery separator is suitable for increasing the capacity of a battery, since the volume of the resulting wound roll can be reduced.

The porous layer preferably has a porosity of from 30 to 90%, and more preferably from 40 to 70%. It is possible to obtain a desired porosity, by adjusting as appropriate the concentration of the inorganic particles and the concentration of a binder.

4. Method of Laminating Porous Layer on Polyolefin Microporous Membrane

Next, the method of laminating the porous layer on the polyolefin microporous membrane in the present invention will be described.

In the present invention, it is possible to obtain a battery separator by laminating the porous layer on the polyolefin microporous membrane which has a fluctuation range of the F25 value in the length direction of 1 MPa or less. When the polyolefin microporous membrane according to the present invention is used, the contact pressure at the tangential line (hereinafter, abbreviated as "coating tangential line") between the polyolefin microporous membrane and a coating roll is more likely to be uniform with respect to the length direction of the polyolefin microporous membrane, thereby facilitating to obtain a uniform coating thickness.

The porous layer can be laminated on the polyolefin microporous membrane, for example, by a method in which a coating liquid containing a resin, inorganic particles, and a dispersion solvent is coated on the polyolefin microporous membrane to a predetermined film thickness, by a known roll coating method to be described later, followed by drying at a temperature of from 40 to 80° C., for a period of time from 5 seconds to 60 seconds. Examples of the solvent include water, an alcohol, and a mixed liquid of these.

Examples of the roll coating method include a reverse roll coating method, a gravure coating method, and the like, and these methods can be performed singly or in combination. Of these, a gravure coating method is preferred in terms of obtaining a uniform coating thickness.

In the present invention, the thickness of the coating tangential line between the coating roll and the polyolefin microporous membrane in the roll coating method is preferably 3 mm or more and 10 mm or less. When the thickness of the coating tangential line is greater than 10 mm, the contact pressure between the polyolefin microporous membrane and the coating roll is increased, and the surface of the coating becomes more susceptible to defects.

Figure 5:
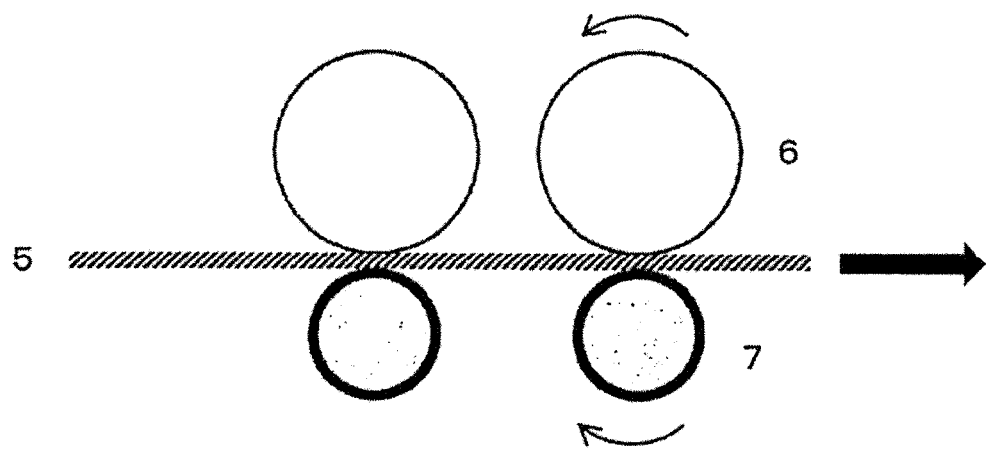
FIG. 5 is a schematic diagram showing an example of a longitudinal stretching apparatus which is used in a re-stretching step.
Figure 6:
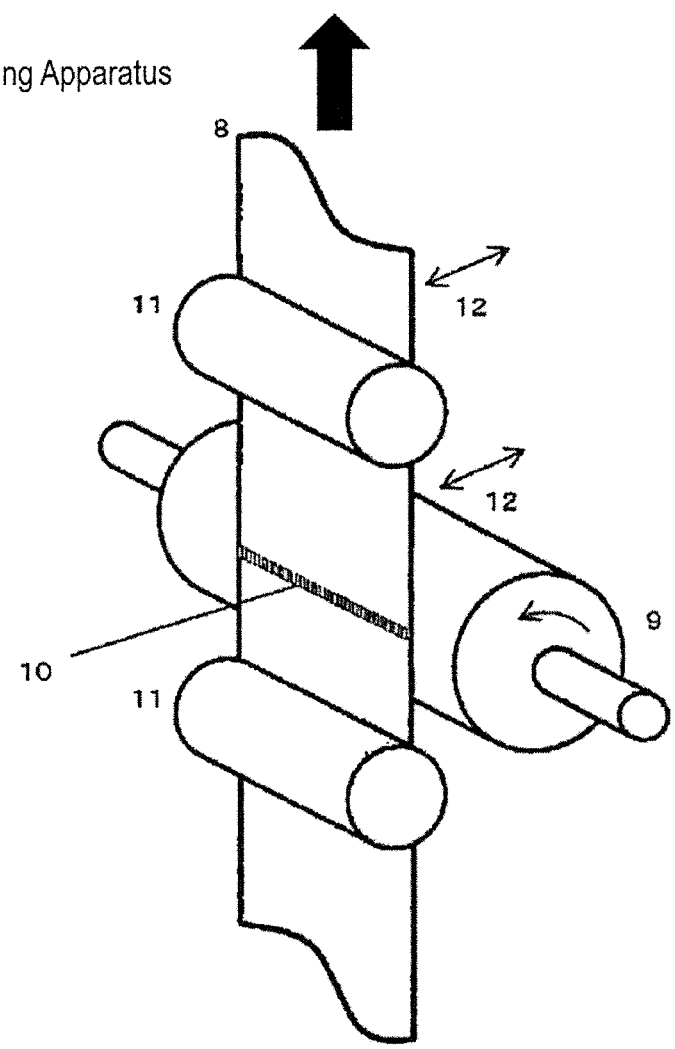
FIG. 6 is a schematic diagram showing an example of a coating apparatus.

The "coating tangential line" as used herein refers to a line at which the coating roll and the polyolefin microporous membrane come into contact with each other, and the "thickness of the coating tangential line" as used herein refers to the width of the coating tangential line in the length direction (see FIG. 5). The thickness of the coating tangential line can be measured by observing the coating tangential line between the coating roll and the polyolefin microporous membrane, from the back surface of the polyolefin microporous membrane. The thickness of the coating tangential line can be adjusted by: adjusting the position of the coating roll relative to the polyolefin microporous membrane, forward and backward; and by adjusting the right and left balance in the horizontal direction of the positions of back rolls disposed at the back side of the coating surface. The back rolls function more effectively, when they are disposed one each at both upstream and downstream of the position of the coating roll.

The coating roll used in the roll coating method preferably has a deflection accuracy of 10 μm/Φ100 mm or less, more preferably 8 μm/Φ100 mm or less, and still more preferably 5 μm/Φ100 mm or less. When the deflection accuracy of the coating roll is within above range, a uniform coating thickness is more easily obtained, even in the length direction. Although a coating roll having a higher deflection accuracy is more expensive, use of such a coating roll is important for achieving the object of the present invention.

The expression that the porous layer has a uniform thickness in the length direction of the separator, as used herein, means that the thickness fluctuation range (R) of the porous layer is 1.0 μm or less, with respect to 1,000 m or more of the length of the separator. The thickness fluctuation range (R) is preferably 0.8 μm or less, and more preferably 0.5 μm or less.

The solids concentration of the coating liquid is not particularly limited, as long as the coating liquid can be coated uniformly. However, the solids concentration is preferably 20% by weight or more and 80% by weight or less, and more preferably 50% by weight or more and 70% by weight or less. When the solids concentration of the coating liquid is within the above preferred range, a porous layer having a uniform coating thickness is more likely to be obtained, and the resulting porous layer can be prevented from being fragile.

5. Battery Separator

A battery separator obtained by laminating the porous layer on the polyolefin microporous membrane preferably has a film thickness of from 6 μm to 30 μm, in terms of the mechanical strength and battery capacity The width of the battery separator is not particularly limited. However, the lower limit of the width is preferably 30 mm, more preferably 60 mm, and still more preferably 100 mm; and the upper limit of the width is preferably 2,000 mm, more preferably 1000 mm, and still more preferably 800 mm. When the thickness of the battery separator is within the above range, the battery separator is suitably used in the production of a battery having a high capacity, and is less susceptible to deflection due to self-weight.

The lower limit of the length of the battery separator is preferably 1,000 m, more preferably 2,000 m, and still more preferably 3,000 m. The upper limit is not particularly defined; however the upper limit is preferably 10,000 m, more preferably 8,000 m, and still more preferably 7,000 m. When the length of the battery separator is within the above range, the productivity of the battery separator is improved, and the battery separator is less susceptible to deflection due to self-weight, when wound into a wound roll.

It is desirable that the battery separator be stored in a dried state. However, when it is difficult to store the battery separator in an absolute dry condition, the battery separator is preferably subjected to a drying treatment under reduced pressure at a temperature of 100° C. or lower, immediately before use.

The battery separator according to the present invention can be used: as a separator for a secondary battery, such as a nickel-hydrogen battery, a nickel-cadmium battery, a nickel-zinc battery, a silver-zinc battery, a lithium secondary battery, or a lithium polymer secondary battery; and as a separator for a plastic film capacitor, a ceramic capacitor, or an electric double layer capacitor. In particular, the battery separator is preferably used as a separator for a lithium ion secondary battery. A description will be given below, with reference to an example in which the battery separator is used in a lithium ion secondary battery. A lithium ion secondary battery includes: an electrode body including a positive electrode and a negative electrode which are laminated one on another with a separator interposed therebetween; and an electrolyte solution (electrolyte). The structure of the electrode body is not particularly limited, and the electrode body may have any known structure. The electrode body may have, for example: an electrode structure in which a disk-like positive electrode and negative electrode are disposed to face one another (coin type); an electrode structure in which plate-like positive electrodes and negative electrodes are laminated alternately (laminated type); and an electrode structure in which a belt-like positive electrode and negative electrode which are layered one on another are wound (wound-type).

EXAMPLES

The present invention will now be described specifically, with reference to Examples. However, the present invention is in no way limited by the Examples. Note that measured values described in the Examples are values measured according to the following methods.

1. Measurement of Fluctuation Range of F25 Value

Five test specimens each having a size of TD: 10 mm×MD: 50 mm were cut out, along the width direction, from each of the polyolefin microporous membranes obtained in Examples and Comparative Examples. The test specimens of both end portions were cut out from the locations 30 mm inside from the end portions in the width direction, of each microporous membrane. Using a table-top type precision universal tester (Autograph AGS-J (manufactured by Shimadzu Corporation)), an S-S curve (the relationship between stress and strain) in the length direction of each test specimen was obtained, in accordance with JIS K7113. A value of the stress at a point when the strain had increased by 25% was read, and the thus read value was divided by the value of the cross-sectional area of each test specimen. The thus calculated value was defined as the F25 value of each test specimen, and the mean value of the F25 values of the 5 test specimens was then obtained, as the mean F25 value in the width direction. The mean F25 value in the width direction was then obtained at 5 points in the length direction at intervals of 250 m, and the fluctuation range of the F25 value was obtained from the difference between the maximum value and the minimum value thereof. Note that, a polyolefin microporous membrane obtained by removing by peeling the porous layer from a battery separator may also be used for preparing test specimens.

Measurement Conditions
Load cell capacity: 1 kN
Distance between clips: 20 mm
Test speed: 20 mm/min
Measurement environment: air temperature 20° C., relative humidity 60%

2. Fluctuation Range (R) of Porous Layer Thickness in Length Direction

Five test specimens each having a size of TD: 10 mm×MD: 50 mm were cut out, along the width direction, from each of the polyolefin microporous membranes obtained in Examples and Comparative Examples. The test specimens of both end portions were cut out from the locations 30 mm inside from the end portions in the width direction, of each microporous membrane.

The porous layer thickness was obtained by SEM observation of the cross section of each of the test specimens. Cross section test specimens were prepared by a cryo-CP method, and the SEM observation was carried out with trace amount of metal microparticles vapor-deposited thereto, in order to prevent charging-up due to electron beams. The region where the inorganic particles are present was determined as the porous layer, and the porous layer thickness was measured in each specimen. The mean value of the measured thicknesses in the 5 test specimens was then obtained, as the mean thickness in the width direction of the porous layer. The mean thickness in the width direction was then obtained at 5 points in the length direction at intervals of 250 m, and the difference between the maximum value and the minimum value thereof was defined as the fluctuation range (R) of the porous layer thickness in the length direction. The mean value of the measured thicknesses in the above described total 25 test specimens was defined as the average thickness T(ave) of the porous layer.

Measurement Apparatus
Field emission-type scanning electron microscope (FE-SEM)S-4800 (manufactured by Hitachi High-Technologies Corporation)
Cross section Polisher (CP) SM-9010 (manufactured by JEOL Ltd.)
Measurement Conditions
Accelerating voltage: 1.0 kV 3. Fluctuation Range of Surface Temperature of Longitudinal Stretching Roll The surface temperature of each longitudinal stretching roll was measured 5 times at intervals of 5 minutes with an infrared thermometer, and the fluctuation range of the surface temperature of the longitudinal stretching roll was obtained from the difference between the maximum value and the minimum value of the measured temperatures.

4. Measurement of Thickness of Coating Tangential Line

The coating tangential line refers to a line in the width direction at which the coating roll and the polyolefin microporous membrane come into contact with each other, during the coating. The thickness of the coating tangential line refers to the width of the coating tangential line in the length direction, and to a value obtained using a scale through the back surface of the polyolefin microporous membrane.

5. Winding Appearance

Each of the wound rolls of the battery separators obtained in Examples and Comparative Examples was visually observed, and the number of locations at which a deflection or winding displacement had occurred was counted.

Evaluation Criteria

○ (Good): None

Δ (Acceptable): 1 to 3 locations x (Poor): 4 locations or more

6. Evaluation of Defects

After removing its outermost peripheral portion from each of the wound rolls of the battery separators obtained in Examples and Comparative Examples, 1 m² of its inner peripheral portion was drawn out to be used as an evaluation sample.

For the detection of defects, a bromine light (a lighting device used for photographing or videotaping) was irradiated to the coating surface, and the presence of defects was visually observed, and the number of the defects was counted.

Evaluation Criteria

○ (Good): 1 location or less

Δ (Acceptable): 2 to 5 locations x (Poor): 6 locations or more

Preparation of Coating Liquid

Reference Example 1

Polyvinyl alcohol (average degree of polymerization: 1,700; degree of saponification: 99% or more), alumina particles having an average particle size of 0.5 μm, and ion exchanged water were mixed at a weight ratio of 6:54:40, respectively, and the resultant was stirred sufficiently to obtain a uniform dispersion. The resultant was then filtered using a filter having a filtration limit of 5 μm, to obtain a coating liquid (a).

Reference Example 2

A copolymer ("POVACOAT" (registered trademark), manufactured by Nisshin Kasei Co., Ltd.) of polyvinyl alcohol, acrylic acid, and methyl methacrylate; alumina particles having an average particle size of 0.5 μm; a solvent (ion exchanged water:ethanol=70:30) were mixed at a weight ratio of 5:45:50, respectively, and the resultant was stirred sufficiently to obtain a uniform dispersion. The resultant was then filtered using a filter having a filtration limit of 5 μm, to obtain a coating liquid (b).

Reference Example 3

An aqueous emulsion (VINYCOAT PVDF AQ360, manufactured by Higashi Nippon Toryo Co., Ltd.) of a polyvinylidene fluoride resin, alumina particles having an average particle size of 0.5 μM, and ion exchanged water were mixed at a weight ratio of 30:30:40, respectively, and the resultant was stirred to obtain a uniform dispersion. The resultant was then filtered using a filter having a filtration limit of 5 μm, to obtain a coating liquid (c).

Production of Polyolefin Microporous Membrane

Example 1

A quantity of 100 parts by mass of a composition composed of: 40% by mass of an ultra-high molecular weight polyethylene having a mass average molecular weight of $2.5 \times 10^6$; and 60% by mass of a high density polyethylene having a mass average molecular weight of $2.8 \times 10^5$; was dry blended with 0.375 parts by mass of tetrakis[methylene-3-(3,5-ditertiarybutyl-4-hydroxyphenyl)-propionate]methane, to obtain a polyethylene composition. A quantity of 30 parts by weight of the resulting polyethylene composition was fed to a twin screw extruder. Further, 70 parts by weight of liquid paraffin was fed to the twin screw extruder through a side feeder, followed by melt blending, to prepare a polyethylene resin solution within the extruder. Subsequently, the resulting polyethylene resin solution was extruded through a die disposed at the distal end of the extruder, at 190° C., and the resultant was drawn with a chill roll whose internal cooling water was maintained at a temperature of 25° C., to prepare an unstretched gel-like sheet.

The resulting unstretched gel-like sheet was allowed to pass through 4 pre-heated rolls such that the surface temperature of the sheet was increased to 110° C., and then led to a longitudinal stretching apparatus A shown in FIG. 1. As the longitudinal stretching rolls, hard chromium plated metal rolls (surface roughness: 0.5 S) each having a width of 1,000 mm and a diameter of 300 mm were used. The surface temperature of each of the longitudinal stretching rolls was 110° C. Doctor blades made of polyester were used as the doctor blades. As the nip rolls, nitrile rubber-coated rolls (manufactured by Katsura Roller Mfg. Co., Ltd.) were used. The longitudinal stretching apparatus A was used as the longitudinal stretching apparatus, and the tip speeds of the respective stretching rolls were set at progressively higher rates toward downstream in the traveling direction. Specifically, the tip speed ratio between the first stretching roll and the second stretching roll was set to 1.3; the tip speed ratio between the second stretching roll and the third stretching roll was set to 1.5; the tip speed ratio between the third stretching roll and the fourth stretching roll was set to 1.8; and the tip speed ratio between the fourth stretching roll and the fifth stretching roll was set to 2.1. Further, the interval between two adjacent stretching rolls was adjusted such that the distance from the point at which the gel-like formed sheet being stretched comes out of contact with one stretching roll, to the point at which the sheet comes into contact with the next stretching roll, was 200 mm. The pressure at which each nip roll comes into contact with a stretching roll was set to 0.3 MPa. In addition, the surface temperature of each stretching roll was controlled such that the fluctuation range of the surface temperature was ±2° C. Subsequently, the resulting sheet was allowed to pass through 4 chill rolls, so that the sheet temperature was cooled to 50° C., to obtain a longitudinally stretched gel-like sheet.

Both end portions of the resulting longitudinally stretched gel-like sheet were held by clips, and stretched 6-fold in the transverse direction at a temperature of 115° C., in a tenter whose internal area had been divided into 20 zones, to form a biaxially stretched gel-like sheet. At this time, the distance between the clips against the sheet travelling direction was maintained at 5 mm from the entrance to the exit of the tenter. The resulting biaxially stretched gel-like sheet was cooled to 30° C., and then liquid paraffin was removed in a washing bath of methylene chloride controlled at a temperature of 25° C., followed by drying in a drying furnace adjusted to 60° C.

Figure 4:
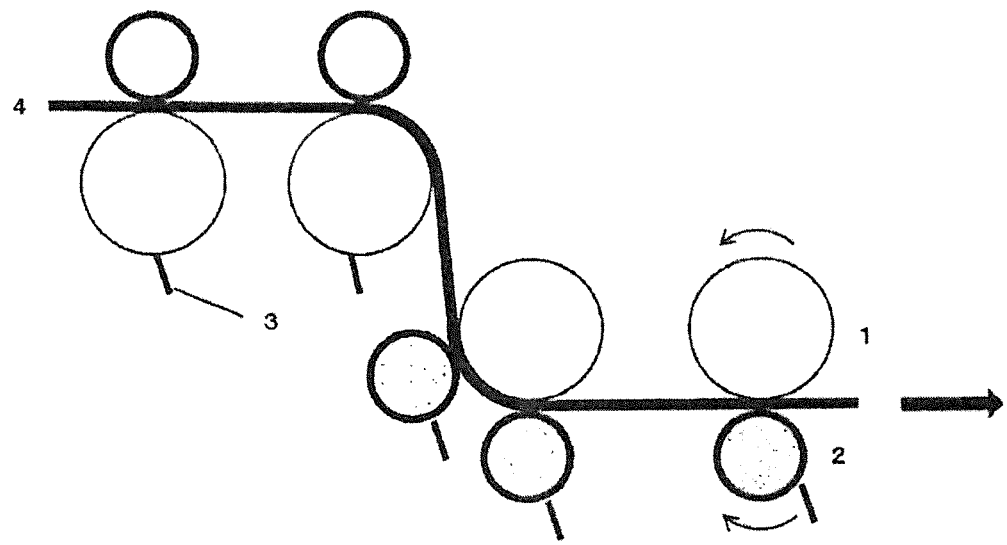
FIG. 4 is a schematic diagram of a longitudinal stretching apparatus D which is used for stepwise biaxial stretching.

The thus obtained dried sheet was re-stretched by a re-stretching apparatus shown in FIG. 4 to a longitudinal magnification of 1.2-fold, and the resultant was subjected to a heat treatment at 125° C. for 20 seconds, to obtain a polyolefin microporous membrane having a thickness of 16 µm. Further, the resulting microporous membrane was wound at a transport speed of 50 m/min, to obtain a wound roll of the polyolefin microporous membrane, having a width of 4,000 mm and a winding length of 5,050 m. The polyolefin microporous membrane was drawn from the resulting wound roll, and subjected to slitting to be processed into a width of 950 mm, to obtain a polyolefin microporous membrane A to be used as a substrate for coating.

Example 2

Figure 2:
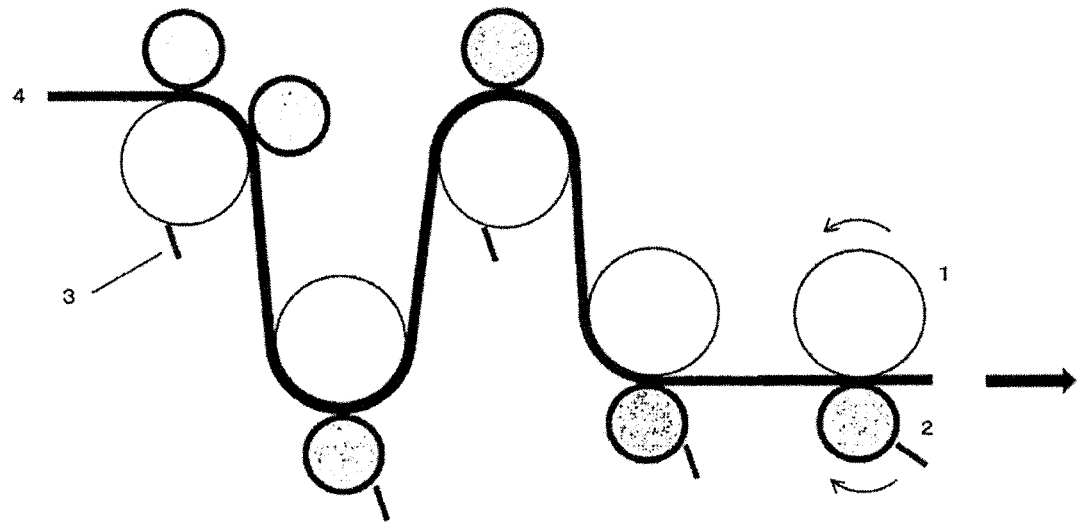
FIG. 2 is a schematic diagram of a longitudinal stretching apparatus B which is used for stepwise biaxial stretching.

The same procedure as in Example 1 was repeated, except that a longitudinal stretching apparatus B shown in FIG. 2 was used instead of the longitudinal stretching apparatus A, as the longitudinal stretching apparatus, to obtain a polyolefin microporous membrane B.

Example 3

Figure 3:
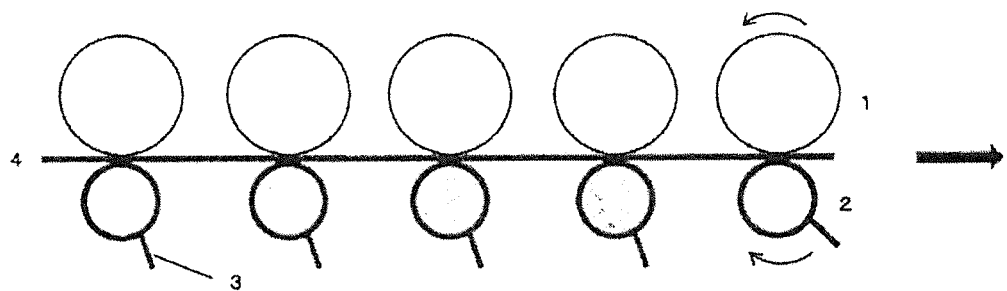
FIG. 3 is a schematic diagram of a longitudinal stretching apparatus C which is used for stepwise biaxial stretching.

The same procedure as in Example 1 was repeated, except that a longitudinal stretching apparatus C shown in FIG. 3 was used instead of the longitudinal stretching apparatus A, as the longitudinal stretching apparatus, to obtain a polyolefin microporous membrane C.

Example 4

The same procedure as in Example 1 was repeated, except: that longitudinal stretching apparatus D shown in FIG. 4 was used instead of the longitudinal stretching apparatus A, as the longitudinal stretching apparatus; and that, in the longitudinal stretching apparatus D, the tip speed ratio between the first stretching roll and the second stretching roll was set to 1.5; the tip speed ratio between the second stretching roll and the third stretching roll was set to 2.0; and the tip speed ratio between the third stretching roll and the fourth stretching roll was set to 2.5; to obtain a polyolefin microporous membrane D.

Example 5

The same procedure as in Example 1 was repeated, except that the pressure at which each nip roll comes into contact with a stretching roll was adjusted to 0.1 MPa in the longitudinal stretching apparatus, to obtain polyolefin microporous membrane E.

Example 6

The same procedure as in Example 1 was repeated, except that the pressure at which each nip roll comes into contact with a stretching roll was adjusted to 0.5 MPa in the longitudinal stretching apparatus, to obtain polyolefin microporous membrane polyolefin microporous membrane F.

Example 7

The amount of the polyethylene resin solution to be extruded was adjusted, and a polyolefin microporous membrane G having a thickness of 7 µm was obtained in the same manner as Example 1.

Example 8

The same procedure as in Example 1 was repeated, except that ceramic-coated metal rolls having a surface roughness of 5.0 S were used as 5 longitudinal stretching rolls in the longitudinal stretching apparatus A, to obtain a polyolefin microporous membrane H.

Example 9

The same procedure as in Example 1 was repeated, except that, in the longitudinal stretching apparatus A, the tip speed ratio between the first stretching roll and the second stretching roll was set to 1.2; the tip speed ratio between the second stretching roll and the third stretching roll was set to 1.5; the tip speed ratio between the third stretching roll and the fourth stretching roll was set to 1.8; and the tip speed ratio between the fourth stretching roll and the fifth stretching roll was set to 2.3; to obtain a polyolefin microporous membrane I.

Example 10

The same procedure as in Example 1 was repeated, except that, in the longitudinal stretching apparatus A, the tip speed ratio between the first stretching roll and the second stretching roll was set to 1.3; the tip speed ratio between the second stretching roll and the third stretching roll was set to 1.7; the tip speed ratio between the third stretching roll and the fourth stretching roll was set to 1.8; and the tip speed ratio between the fourth stretching roll and the fifth stretching roll was set to 1.9; to obtain a polyolefin microporous membrane J.

Comparative Example 1

Both end portions of the unstretched gel-like sheet formed in Example 1 were held by clips, and the sheet was led to a tenter whose temperature was controlled at 116° C. and whose internal area had been divided into 5 zones. The resultant was then stretched 7-fold in the longitudinal direction and 7-fold in the transverse direction by a simultaneous biaxial stretching method, to obtain a simultaneously biaxially stretched gel-like sheet. At this time, the distance between the clips against the sheet travelling direction sheet was 5 mm at the entrance of the tenter, and 95 mm at the exit of the tenter. Subsequently, the resulting simultaneously biaxially stretched gel-like sheet was cooled to 30° C., and washed in a washing bath of methylene chloride controlled at a temperature of 25° C. to remove liquid paraffin. The resulting sheet was dried in a drying furnace adjusted to 60° C., to obtain a polyolefin microporous membrane. Further, the resulting microporous membrane was wound at a transport speed of 50 m/min, to obtain a wound roll of the polyolefin microporous membrane, having a width of 4,000 mm and a winding length of 5,050 m. The polyolefin microporous membrane was drawn from the resulting wound roll, and subjected to slitting to be processed into a width of 950 mm, to obtain a polyolefin microporous membrane K to be used as a substrate for coating.

Comparative Example 2

The same procedure as in Example 1 was repeated, except that no nip roll was used for all 5 stretching rolls in the longitudinal stretching apparatus A, to obtain a polyolefin microporous membrane L.

Comparative Example 3

The same procedure as in Example 1 was repeated, except that the longitudinal stretching apparatus B was used as the longitudinal stretching apparatus, and that no nip roll was used for all 5 stretching rolls, to obtain a polyolefin microporous membrane M.

Comparative Example 4

The same procedure as in Example 1 was repeated, except that the pressure at which each nip roll comes into contact with a stretching roll was set to 0.04 MPa in the longitudinal stretching apparatus A, to obtain a polyolefin microporous membrane N.

Comparative Example 5

The same procedure as in Example 1 was repeated, except that hard chromium plated metal rolls having a surface roughness of 0.1 S were used as the longitudinal stretching rolls in the longitudinal stretching apparatus A, to obtain polyolefin microporous membrane O.

Comparative Example 6

The same procedure as in Example 1 was repeated, except that, in the longitudinal stretching apparatus A, the tip speed ratio between the first stretching roll and the second stretching roll was set to 1.6; the tip speed ratio between the second stretching roll and the third stretching roll was set to 1.6; the tip speed ratio between the third stretching roll and the fourth stretching roll was set to 1.7; and the tip speed ratio between the fourth stretching roll and the fifth stretching roll was set to 1.7; to obtain a polyolefin microporous membrane P.

Comparative Example 7

The same procedure as in Example 1 was repeated, except that, in the longitudinal stretching apparatus A, the tip speed ratio between the first stretching roll and the second stretching roll was set to 1.1; the tip speed ratio between the second stretching roll and the third stretching roll was set to 1.3; the tip speed ratio between the third stretching roll and the fourth stretching roll was set to 1.5; and the tip speed ratio between the fourth stretching roll and the fifth stretching roll was set to 3.5; to obtain a polyolefin microporous membrane Q.

Comparative Example 8

The same procedure as in Example 1 was repeated, except that, in the longitudinal stretching apparatus A, the tip speed ratio between the first stretching roll and the second stretching roll was set to 1.3; the tip speed ratio between the second stretching roll and the third stretching roll was set to 1.7; the tip speed ratio between the third stretching roll and the fourth stretching roll was set to 1.8; and the tip speed ratio between the fourth stretching roll and the fifth stretching roll was set to 1.9; to obtain a polyolefin microporous membrane R.

Comparative Example 9

The same procedure as in Example 1 was repeated, except that the fluctuation range of the temperature of each of the longitudinal stretching rolls was ±3° C. in the longitudinal stretching apparatus A, to obtain a polyolefin microporous membrane S.

Preparation of Battery Separator

Example 11

To the polyolefin microporous membrane A obtained in Example 1, the coating liquid (a) was coated, using a coating apparatus (gravure coating method) shown in FIG. 5 at a transport speed of 50 m/min. The resultant was then allowed to pass through a hot air drying furnace controlled at 50° C. for 10 seconds to carry out drying, thereby obtaining a battery separator. At this time, the positions of the coating roll and the back rolls in the coating apparatus were adjusted such that the thickness of the coating tangential line was within the range of from 3 to 5 mm. Further, as the coating roll, a gravure roll having a diameter of 100 mm and a deflection accuracy of 8 μm/Φ100 mm was used. The resultant was then subjected to slitting, to obtain a battery separator having a battery separator thickness of 19 μm, a width of 900 mm, and a winding length of 5,000 m.

Examples 12 to 20

The same procedure as in Example 11 was repeated, except that the polyolefin microporous membranes B to J obtained in Examples 2 to 10 were used, to obtain battery separators.

Example 21

The same procedure as in Example 11 was repeated, except that the coating liquid (b) was used instead of the coating liquid (a), to obtain a battery separator.

Example 22

The same procedure as in Example 11 was repeated, except that the coating liquid (c) was used instead of the coating liquid (a), to obtain a battery separator.

Example 23

The same procedure as in Example 11 was repeated, except that a gravure roll having a diameter of 100 mm and a deflection accuracy of 10 μm 10100 mm was used as the coating roll, to obtain a battery separator.

Example 24

The same procedure as in Example 11 was repeated, except that a gravure roll having a diameter of 100 mm and a deflection accuracy of 5 μm/Φ100 mm was used as the coating roll, to obtain a battery separator.

Example 25

The same procedure as in Example 11 was repeated, except that the positions of the gravure roll and the back rolls in the coating apparatus were adjusted such that the thickness of the coating tangential line was within the range of from 5 to 7 mm, to obtain a battery separator.

Example 26

The same procedure as in Example 11 was repeated, except that the positions of the gravure roll and the back rolls in the coating apparatus were adjusted such that the thickness of the coating tangential line was within the range of from 8 to 10 mm, to obtain a battery separator.

Example 27

The same procedure as in Example 11 was repeated, except that the cell capacity of the gravure roll in the coating apparatus was changed so that the porous layer thickness of 5 μm to be formed, thereby obtaining a battery separator.

Comparative Examples 10 to 18

The same procedure as in Example 11 was repeated, except that the polyolefin microporous membranes K to S obtained in Comparative Examples 1 to 9 were used, to obtain battery separators.

Comparative Example 19

The same procedure as in Example 11 was repeated, except that a gravure roll having a diameter of 100 mm and a deflection accuracy of 12 μm/Φ100 mm was used as the coating roll, to obtain a battery separator.

Comparative Example 20

The same procedure as in Example 11 was repeated, except that the positions of the gravure roll and the back rolls in the coating apparatus were adjusted such that the thickness of the coating tangential line was within the range of from 11 to 13 mm, to obtain a battery separator.

Comparative Example 21

The same procedure as in Example 11 was repeated, except that the cell capacity of the gravure roll in the coating apparatus was changed so that the porous layer thickness of 8 μm to be formed, thereby obtaining a battery separator.

Table 1 shows the production conditions and the properties of the polyethylene microporous membrane obtained in Examples 1 to 10 and Comparative Examples 1 to 9. Table 2 shows the production conditions and the properties of the battery separators obtained in Examples 11 to 27 and Comparative Examples 10 to 21, and the properties of the wound rolls thereof.

TABLE 1

| | Stretcing method | Longitudinal stretching machine | Surface roughness of longitudinal stretching roll (S) | Speed ratio of the longitudinal stretching rolls | Nip pressure (Mpa) | Fluctuation range of surface temperature of longitudinal streching roll | Distance between clips at a tenter exit (mm) | Thickness of polyethylene porous membrane (μm) | Fluctuation range of F25 value |
|---|---|---|---|---|---|---|---|---|---|
| Example 1 | stepwise biaxial | A | 0.5 | 1.3/1.5/1.8/2.1 | 0.3 | within ±2° C. | 5 | 16 | 0.6 |
| Example 2 | stepwise biaxial | B | 0.5 | 1.3/1.5/1.8/2.1 | 0.3 | within ±2° C. | 5 | 16 | 0.5 |
| Example 3 | stepwise biaxial | C | 0.5 | 1.3/1.5/1.8/2.1 | 0.3 | within ±2° C. | 5 | 16 | 0.7 |
| Example 4 | stepwise biaxial | D | 0.5 | 1.5/2.0/2.5 | 0.3 | within ±2° C. | 5 | 16 | 0.8 |
| Example 5 | stepwise biaxial | A | 0.5 | 1.3/1.5/1.8/2.1 | 0.1 | within ±2° C. | 5 | 16 | 0.4 |
| Example 6 | stepwise biaxial | A | 0.5 | 1.3/1.5/1.8/2.1 | 0.5 | within ±2° C. | 5 | 16 | 0.9 |
| Example 7 | stepwise biaxial | A | 0.5 | 1.3/1.5/1.8/2.1 | 0.3 | within ±2° C. | 5 | 7 | 0.7 |
| Example 8 | stepwise biaxial | A | 5.0 | 1.3/1.5/1.8/2.1 | 0.3 | within ±2° C. | 5 | 16 | 0.4 |
| Example 9 | stepwise biaxial | A | 0.5 | 1.2/1.5/1.8/2.3 | 0.3 | within ±2° C. | 5 | 16 | 0.5 |
| Example 10 | stepwise biaxial | A | 0.5 | 1.3/1.7/1.8/1.9 | 0.3 | within ±2° C. | 5 | 16 | 0.7 |
| Comparative Example 1 | stepwise biaxial | — | — | — | — | — | 95 | 16 | 3.6 |
| Comparative Example 2 | simultaneous biaxial | A | 0.5 | 1.3/1.5/1.8/2.1 | — | within ±2° C. | 5 | 16 | 1.9 |
| Comparative Example 3 | stepwise biaxial | B | 0.5 | 1.3/1.5/1.8/2.1 | — | within ±2° C. | 5 | 16 | 1.7 |
| Comparative Example 4 | stepwise biaxial | A | 0.5 | 1.3/1.5/1.8/2.1 | 0.04 | within ±2° C. | 5 | 16 | 1.5 |
| Comparative Example 5 | stepwise biaxial | A | 0.1 | 1.3/1.5/1.8/2.1 | 0.3 | within ±2° C. | 5 | 16 | 1.2 |
| Comparative Example 6 | stepwise biaxial | A | 0.5 | 1.6/1.6/1.7/1.7 | 0.3 | within ±2° C. | 5 | 16 | 1.6 |
| Comparative Example 7 | stepwise biaxial | A | 0.5 | 1.1/1.3/1.5/3.5 | 0.3 | within ±2° C. | 5 | 16 | 1.4 |

TABLE 1-continued

|  | Stretcing method | Longitudinal stretching machine | Surface roughness of longitudinal stretching roll (S) | Speed ratio of the longitudinal stretching rolls | Nip pressure (Mpa) | Fluctuation range of surface temperature of longitudinal streching roll | Distance between clips at a tenter exit (mm) | Thickness of polyethylene porous membrane (μm) | Fluctuation range of F25 value |
|---|---|---|---|---|---|---|---|---|---|
| Comparative Example 8 | stepwise biaxial | A | 0.5 | 1.3/1.7/1.8/1.9 | 0.3 | within ±2° C. | 5 | 16 | 2.2 |
| Comparative Example 9 | stepwise biaxial | A | 0.5 | 1.3/1.5/1.8/2.1 | 0.3 | within ±3° C. | 5 | 16 | 1.3 |

TABLE 2

|  | Polyethylene porous membrane | Coating solution | Thickness of coating tangential line (mm) | Deflection precision of coating roll (um/φ100 mm) | Porous layer thickness (μm) | Fluctuation range of porous layer thickness in length direction (μm) | Winding appearance | Defects |
|---|---|---|---|---|---|---|---|---|
| Example 11 | A | a | 3~5 | 8 | 3 | 0.5 | ○ | ○ |
| Example 12 | B | a | 3~5 | 8 | 3 | 0.4 | ○ | ○ |
| Example 13 | C | a | 3~5 | 8 | 3 | 0.6 | ○ | ○ |
| Example 14 | D | a | 3~5 | 8 | 3 | 0.9 | ○ | ○ |
| Example 15 | E | a | 3~5 | 8 | 3 | 0.3 | ○ | ○ |
| Example 16 | F | a | 3~5 | 8 | 3 | 0.8 | ○ | ○ |
| Example 17 | G | a | 3~5 | 8 | 3 | 0.8 | ○ | ○ |
| Example 18 | H | a | 3~5 | 8 | 3 | 0.4 | ○ | ○ |
| Example 19 | I | a | 3~5 | 8 | 3 | 0.4 | ○ | ○ |
| Example 20 | J | a | 3~5 | 8 | 3 | 0.6 | ○ | ○ |
| Example 21 | A | b | 3~5 | 8 | 3 | 0.5 | ○ | ○ |
| Example 22 | A | c | 3~5 | 8 | 3 | 0.5 | ○ | ○ |
| Example 23 | A | a | 3~5 | 10 | 3 | 0.7 | ○ | ○ |
| Example 24 | A | a | 3~5 | 5 | 3 | 0.4 | ○ | ○ |
| Example 25 | A | a | 5~7 | 8 | 3 | 0.5 | ○ | ○ |
| Example 26 | A | a | 8~10 | 8 | 3 | 0.5 | ○ | ○ |
| Example 27 | A | a | 3~5 | 8 | 5 | 0.7 | ○ | ○ |
| Comparative Example 10 | K | a | 3~5 | 8 | 3 | 2.1 | x | ○ |
| Comparative Example 11 | L | a | 3~5 | 8 | 3 | 1.8 | △ | ○ |
| Comparative Example 12 | M | a | 3~5 | 8 | 3 | 1.7 | △ | ○ |
| Comparative Example 13 | N | a | 3~5 | 8 | 3 | 1.6 | △ | ○ |
| Comparative Example 14 | O | a | 3~5 | 8 | 3 | 1.3 | △ | ○ |
| Comparative Example 15 | P | a | 3~5 | 8 | 3 | 1.7 | △ | ○ |
| Comparative Example 16 | Q | a | 3~5 | 8 | 3 | 1.5 | △ | ○ |
| Comparative Example 17 | R | a | 3~5 | 8 | 3 | 2.0 | △ | ○ |
| Comparative Example 18 | S | a | 3~5 | 8 | 3 | 1.7 | △ | ○ |
| Comparative Example 19 | A | a | 3~5 | 12 | 3 | 1.8 | △ | ○ |
| Comparative Example 20 | A | a | 11~13 | 8 | 3 | 0.6 | ○ | △ |
| Comparative Example 21 | A | a | 3~5 | 8 | 8 | 1.3 | ○ | ○ |

DESCRIPTION OF SYMBOLS 1. longitudinal stretching roll
2. nip roll
3. blade
4. unstretched gel-like sheet
5. biaxially stretched sheet
6. longitudinal re-stretching roll
7. nip roll for longitudinal re-stretching
8. polyolefin microporous membrane
9. coating roll
10. coating tangential line
11. back roll
12. roll position adjusting direction

The invention claimed is:

1. A method of producing a polyolefin microporous membrane comprising:
   (a) melt blending a polyolefin resin and a membrane-forming solvent to prepare a polyolefin resin solution;
   (b) extruding the polyolefin resin solution into a sheet, by an extruder, and cooling the resultant to form an unstretched gel-like sheet;
   (c) allowing the unstretched gel-like sheet to pass through at least 3 sets of longitudinal stretching rolls, wherein the membrane-forming solvent is scraped off from the surface of the stretching roll so that the residual solvent cannot be visually observed on the roll surface, wherein a tip speed ratio between two adjacent stretching rolls in a first stage of a stretching step is 1.5 or less and differences in tip speed ratios between respective two adjacent stretching rolls are each 0.5 or less, to be stretched in the longitudinal direction by the stretching rolls whose respective tip speeds are set at progressively higher rates in the direction in which the sheet passes, thereby obtaining a longitudinally stretched gel-like sheet (wherein one longitudinal stretching roll, and one or more nip rolls coated with a heat resistant rubber and in contact with the longitudinal stretching roll in parallel, are defined as one set of longitudinal stretching rolls, wherein the nip roll(s) comes into contact with the longitudinal stretching roll at a pressure of 0.05 MPa to 0.5 MPa);
   (d) stretching the longitudinally stretched gel-like sheet in the transverse direction, with the sheet held such that the distance between clips at a tenter exit is 50 mm or less, to obtain a biaxially stretched gel-like sheet;
   (e) extracting the membrane-forming solvent from the biaxially stretched gel-like sheet, followed by drying; and
   (f) subjecting the dried sheet to a heat treatment, to obtain a polyolefin microporous membrane.

2. The method according to claim 1, wherein, in the step (c), the tip speed ratios between respective two adjacent longitudinal stretching rolls are set at progressively higher rates.

3. A method of producing a wound roll of a polyolefin microporous membrane, the method comprising, in addition to the steps included in the method according to claim 1, the step of winding the polyolefin microporous membrane about a winding core at a transport speed of 50 m/min or more.

4. A method of producing a battery separator, the method comprising, in addition to the steps included in the method according to claim 1, the step of coating a coating liquid containing a water-soluble resin or a water-dispersible resin and heat resistance particles, on at least one surface of the polyolefin microporous membrane, by a roll coating method using a coating roll having a deflection accuracy of 10 μm Φ100 mm or less, followed by drying.

5. The method according to claim 4, wherein the coating roll is a gravure roll.

6. A method of producing a wound roll of a polyolefin microporous membrane, the method comprising, in addition to the steps included in the method according to claim 2, the step of winding the polyolefin microporous membrane about a winding core at a transport speed of 50 m/min or more.

7. A method of producing a battery separator, the method comprising, in addition to the steps included in the method according to claim 2, the step of coating a coating liquid containing a water-soluble resin or a water-dispersible resin and heat resistance particles, on at least one surface of the polyolefin microporous membrane, by a roll coating method using a coating roll having a deflection accuracy of 10 μm Φ100 mm or less, followed by drying.

* * * * *